(No Model.)

G. B. SCOTT.
PRINTING TELEGRAPH.

No. 274,665. Patented Mar. 27, 1883.

(No Model.) 5 Sheets—Sheet 4.

G. B. SCOTT.
PRINTING TELEGRAPH.

No. 274,665. Patented Mar. 27, 1883.

Witnesses
Chas. H. Smith
J. Hail

Inventor
George B. Scott
per Lemuel W. Serrell
atty (No Model.) 5 Sheets—Sheet 5.
G. B. SCOTT.
PRINTING TELEGRAPH.
No. 274,665. Patented Mar. 27, 1883.
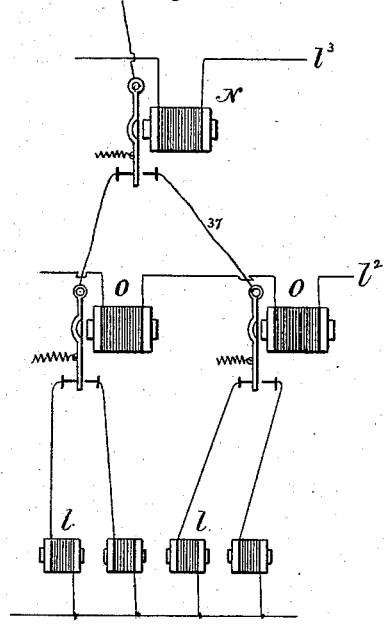
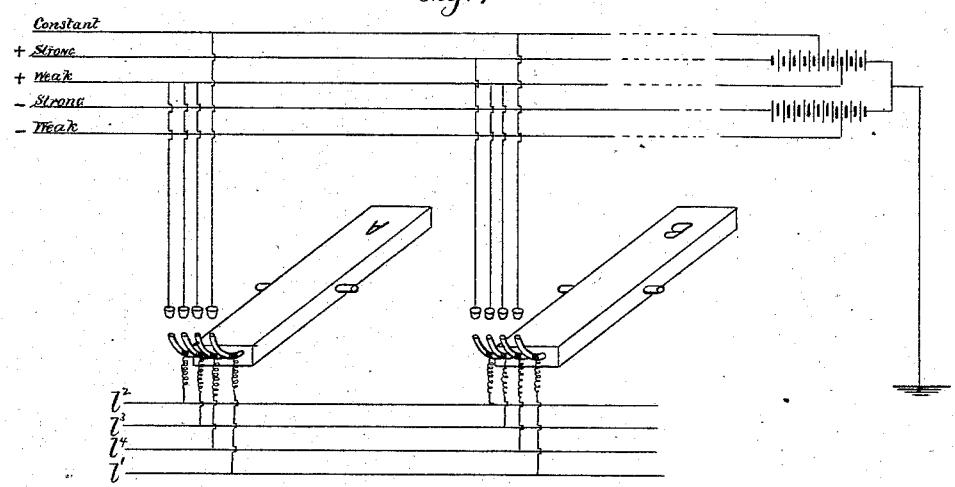

UNITED STATES PATENT OFFICE.

GEORGE B. SCOTT, OF BROOKLYN, NEW YORK.

PRINTING-TELEGRAPH.

SPECIFICATION forming part of Letters Patent No. 274,665, dated March 27, 1883.

Application filed October 9, 1882. (No model.)

*To all whom it may concern:*

Be it known that I, GEORGE B. SCOTT, of Brooklyn, in the county of Kings and State of New York, have invented an Improvement in Printing-Telegraphs, of which the following is a specification.

Printing-telegraphs have been made with one line-wire for the pulsations that set the type-wheel and another line-wire for the printing-magnet.

I make use of four line-wires and magnets operating switch-armatures in such a manner as to direct an electric current to the proper magnet in the receiving-instrument to move a stop that arrests the rotation of the type-wheel at the proper place for the given letter to be printed. By the use of four line-wires, and by permutating the circuit-connections, I am able to direct the current in such a manner to the instrument that I can operate either one of the forty-eight stops, or less, and thereby arrest the type-wheel at the desired letter. If a type-wheel with only the ordinary letters is employed, the same may be operated by a less number of wires—say three—by permutating the switch-connections.

I will first describe the peculiarities of the instrument and then the circuit-connections.

Figure 1:
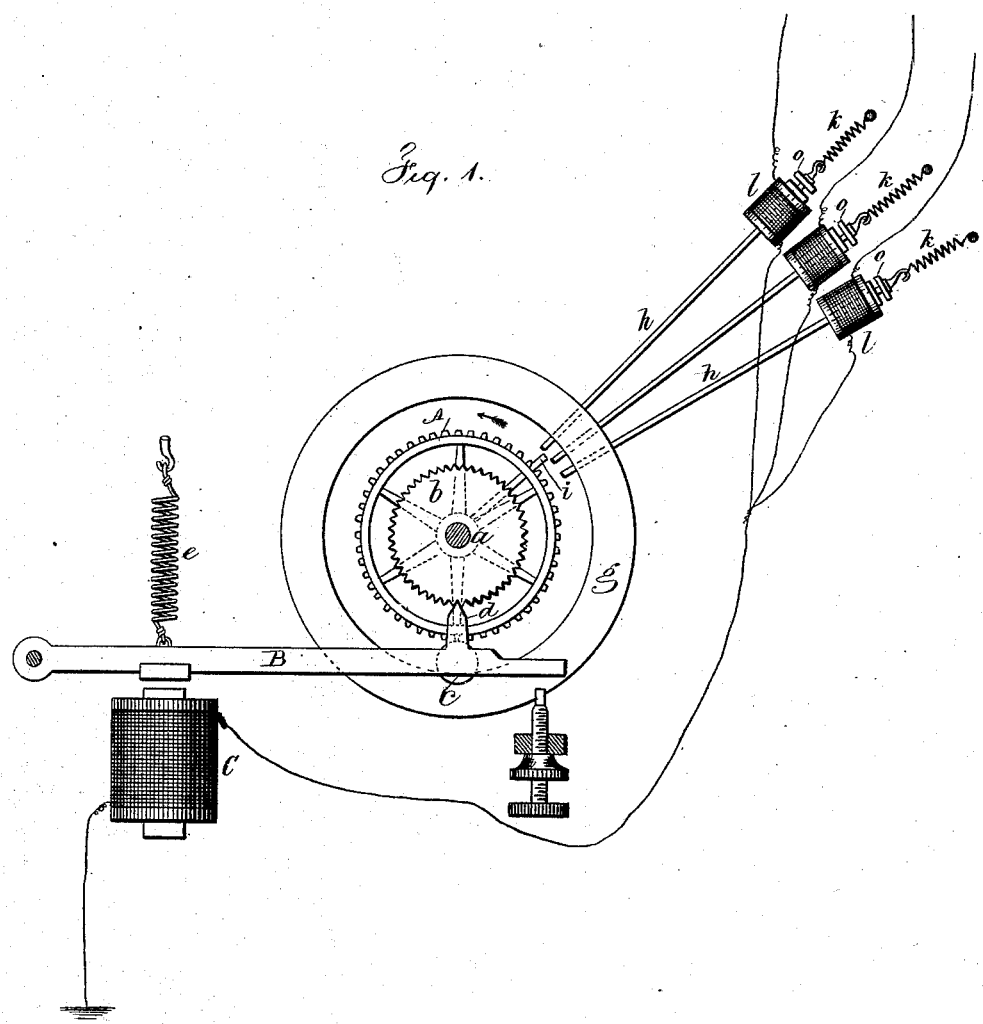
Figure 2:
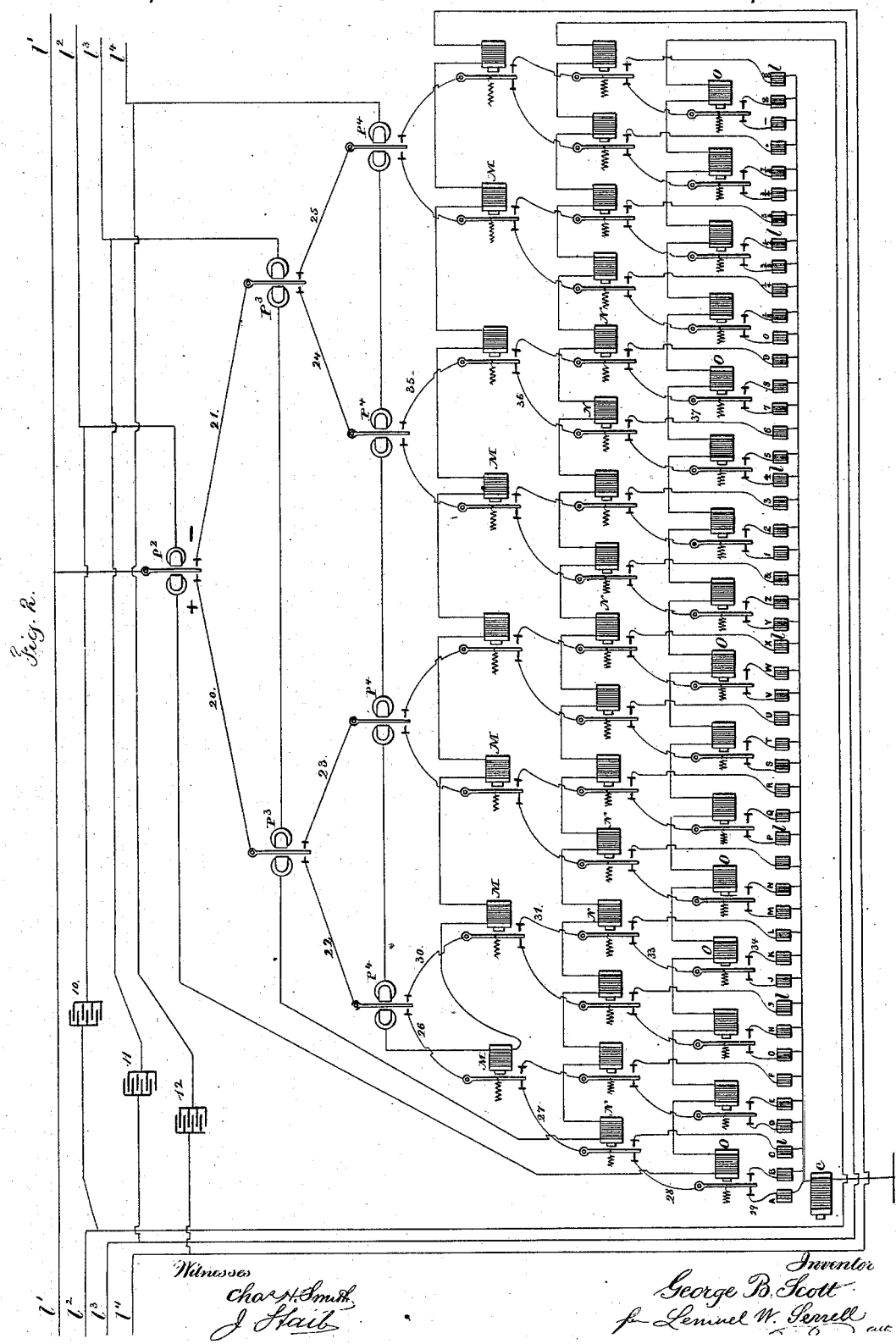
Figure 3:
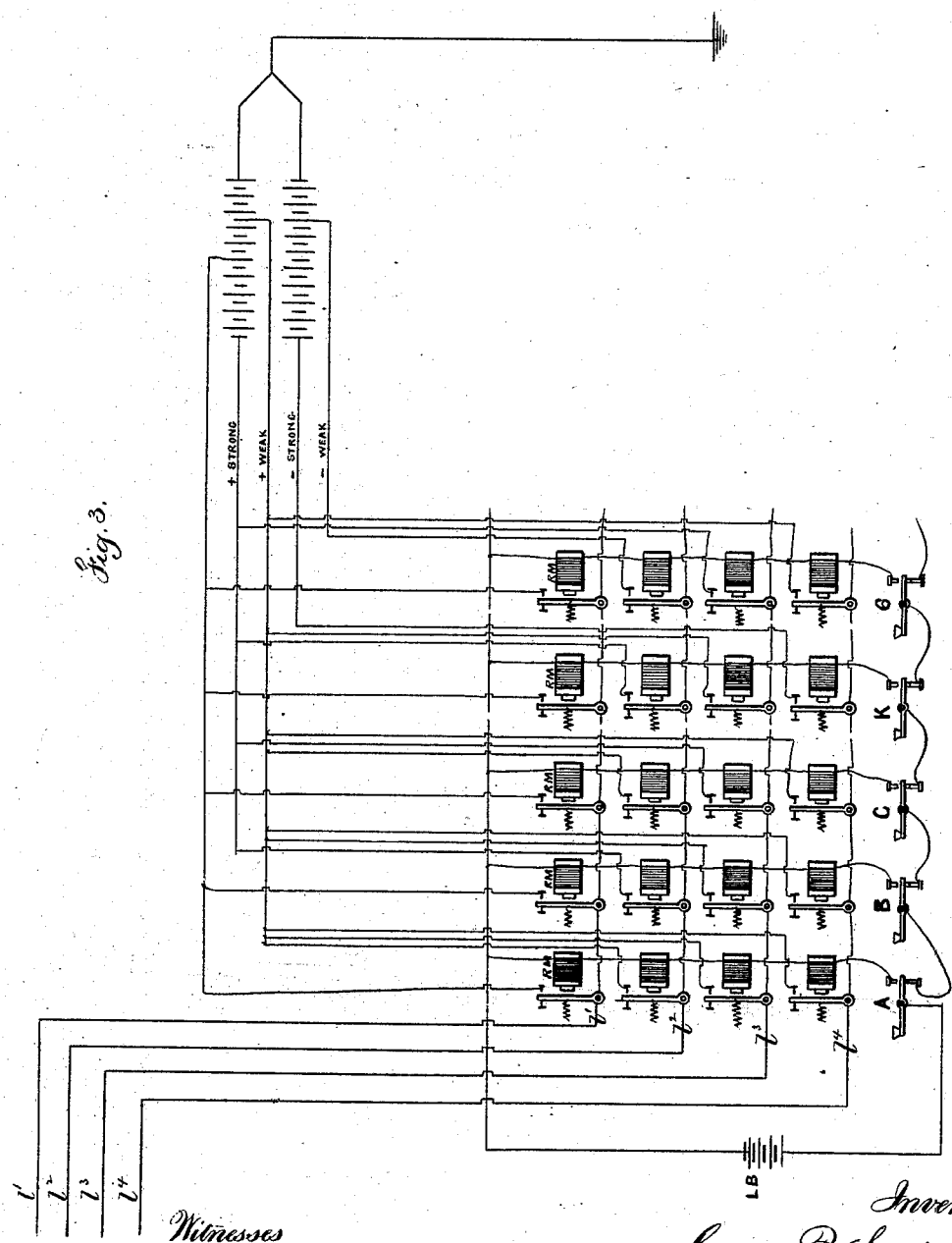

Figure 1 is a diagram representing the instrument. Fig. 2 is a diagram of the circuit-connections at one receiving-instrument, and Fig. 3 is a diagram of five of the keys and connections at the transmitting-station.

The type-wheel A is presumed to have forty-eight characters. These are shown in a row along the bottom part of Fig. 2. They represent the letters of the alphabet, numerals, fractions, hundreds, thousands, punctuations, and a blank space for dividing words and sentences. The two 0's, one above the other, $\frac{0}{0}$, as shown, can be printed by one impression, and represent hundreds, and three 0's, one above the other, $\frac{0}{0}$, are also printed by one impression, and represent thousands. In stock and market quotations this is of great advantage, because it lessens the number of impressions and the space required on the paper.

Upon the type-wheel shaft $a$ there is a toothed wheel, $b$, with forty-eight (48) spaces. The printing-lever B has upon it the printing-roller $c$, and any suitable device for feeding the paper. It also has a tooth, $d$, that enters the spaces between the teeth of $b$ and prevents the type-wheel rotating. The spring $e$ performs the printing. It also holds the printing-lever B with its tooth $d$ in $b$ until the magnet C draws the printing-lever down.

There is upon the type-wheel shaft an arm, $i$, and around the path described by this arm there is a ring or frame, $g$, with forty-eight (48) radial stops, $h$. Each stop is made to slide freely in its supporting-ring, and there is a delicate spring, $k$, that is adjusted to draw the stop outwardly, and upon the stop-rod is an armature, $o$, and there is a small magnet, $l$, to each stop. In the drawings but three of these radial stops and their appliances are shown.

A spring or weight-power and train of gearing are employed to tend constantly to rotate the type-wheel shaft. The same, however, is held by the tooth $d$. When a current is directed as hereinafter described, it reaches the magnet $l$, that is apportioned to the letter or character that has to be printed. The armature $o$ is attracted and the stop $h$ moved inwardly to the path of the arm $i$. The current passes onward through C, drawing down the printing-lever B, liberating the type-wheel, which is turned around until its arm $i$ is stopped by $h$. As the current ceases, the spring $e$ (which is properly adjusted to act before $l$ releases $o$) draws up the printing-lever, giving the impression and holding the type-wheel for the next operation. It is to be understood that the paper-feed should take place as the lever B is drawn down by the magnet C.

I will now describe the circuits and switch-magnets, and remark that the wires in Fig. 2 are represented as passing through the row of magnets $l$, which, for convenience, are shown in a straight row, instead of being in a circular range, and the magnet C is also represented with its ground-connection and a circuit-wire from the range of magnets $l$ to the helix-wire of C; hence a current passing through either of the helices $l$ goes from there through C, and thence to the ground.

In operating stock-reporting telegraphs it is usual to have a number of instruments in one circuit. I therefore have represented the line-wires $l'$ $l^2$ $l^3$ $l^4$ as continuing on, so as to go to the next instrument.

At the central or sending station a transmitting-instrument is provided. It may be of any desired construction, usually with keys, the same being of suitable character to produce the proper circuit-connections to batteries and to the line, and the batteries are arranged, in connection with the transmitting-keys, so as to select and send the proper current by each key to operate the instruments at the receiving-station. I have shown in the diagram Fig. 3 five of the keys at the "central or transmitting station" to illustrate the mode of operation. When any key is depressed it puts upon the line $l'$ a current which ultimately reaches one of the magnets $l$. The intermediate magnetic switches at each printing-instrument direct the current and determine which letter of the types shall be printed.

Upon the line-wires $l^2$, $l^3$, and $l^4$ a positive or a negative current can be applied, and that current can be strong or weak. Hence each wire can be in one of four conditions—viz., + strong or + weak, − strong or − weak—and the keys at the transmitter select and permutate these currents to the respective lines. The polarized relay $P^2$ is in the line $l^2$ and its tongue in the line $l'$. The polarized relays $P^3$ are in the line $l^3$ and their tongues in the branches 20 21. The polarized relays $P^4$ are in the line $l^4$ and their tongues in the branches 22 23 24 25. The row of electro-magnets M is in the line $l^4$, and their armatures respond to strong currents, but their springs prevent them responding to weak currents. The electro-magnets N in the next row below have their helices in the line $l^3$, and they respond to strong currents only. The helices of the row of electro-magnets O are in the line $l^2$, and they respond to strong currents only.

By observing the back and front stops of the electro-magnets M N O and the connections from them, and by presuming that + currents will move the polarized tongues of $P^2$, $P^3$, and $P^4$ to the left and − currents to the right the circuits can be traced as follows: Suppose the key A puts to $l^2$ a + weak current, to $l^3$ a + weak current, to $l^4$ a + weak current, then the current from $l'$ goes by tongue of $P^2$ to 20, and by $P^3$ to 22, and by $P^4$ to 26, and by M to 27, and by N to 28, and by O to 29, and to magnet $l$ for letter A. Suppose, now, the key for letter K be depressed, it sends on line $l^2$ a + strong current, on line $l^3$ a + weak current, and on line $l^4$ a − strong current. These, acting in the respective relays, cause the constant current from $l'$ to go by tongue of $P^2$ by 20 to $P^3$, and by 22 to $P^4$, and by 30 to M and 31 to N, and by 33 to O, and by 34 to magnet $l$, and stops type-wheel at K. Suppose, now, that key for type 6 is depressed, it puts on line $l^2$ a − weak current or strong current, on line $l^3$ a + strong current, and on line $l^4$ a + weak current. These currents, acting in the respective relays, close the circuit-connections, so that the current travels from $l'$ by tongue of $P^2$ and 21 to $P^3$, and by 24 to $P^4$, and by 35 to M, and by 36 to N, and by 37 direct to magnet $l$ on printer allotted for 6.

It will be seen that with the connections to C F L R U X & 3 6 9, &c., the magnets O do not act to change the circuits. Hence it makes no difference in selecting the permutating-currents for those letters whether weak or strong currents are sent. By following out the circuit-connections, as shown, and bearing in mind the action of the positive, negative, and increase currents on the respective lines, and the different operations performed by each, an electrician will have no difficulty in selecting the particular character of currents to be sent on the different lines in order to change the armature-switches to right or left and direct the current to the particular magnet of the printer corresponding to the key that is depressed.

It is to be borne in mind that the ranges of electro-magnets M N O work only by increase of strength of current, moving the switch-armatures to the right. The armature-switches remain closed by their springs to the left when weak currents are sent. On the other hand, the polarized instruments $P^2$ $P^3$ $P^4$ respond to change of polarity, regardless of strength.

In the illustration of the keys I have shown the four line-wires as connected to the pivots of armatures and the front stops connected to lines marked + strong + weak, − strong − weak, so as to select from the respective wires the current required for the respective lines.

Upon reference to Fig. 3 it will be seen that when one key is depressed the local circuit passing through all four of the electro-magnets allotted to that key is closed. Hence the armatures of all such magnets will be moved and close the circuits to the respective line-wires $l'$ $l^2$ $l^3$ $l^4$, and the proper current will be sent upon each line, because the branch wires, coming to the respective front stops of the electro-magnets, lead to the source of the proper electric current, so that if the key A is closed the line $l'$ is connected to the constant current, the line $l^2$ to a + weak current, the line $l^3$ to a + weak current, and the line $l^4$ to a + weak current.

The connections for the other keys will be made upon the principles before explained, so that by permutating the currents in polarity and strength to the different lines the switches at the receiving-instruments will be operated as aforesaid.

The keys A B C, &c., (shown as having contacts both above and below the keys when in a normal position,) have the local circuit from battery L B passing from bottom stop of one to pivot of next key. Hence the depression of any one key breaks the circuit to those beyond, but closes it to its own relay-magnets R M.

Any desired circuit-closing key may be employed, with as many contacts as there are lines, so as to dispense with relay-magnets. I have shown two such keys in Fig. 7, in which it will be seen that when the key is depressed connections are made to the respective wires and currents sent over the various lines of the strengths required to direct the constant current to the magnet of the proper letter. To illustrate. When A is depressed the constant battery-current will be connected to line-wire $l'$ and the + weak current will pass to lines $l^2$ $l^3$ $l^4$ to operate in the manner before described. When key B is depressed connections are made between line $l'$ and constant battery-current, between $l^3$ and $l^4$ with + weak current, and between $l^2$ and + strong current. These illustrate the manner in which the connections are permutated to send the required currents upon each line-wire.

Figure 4:
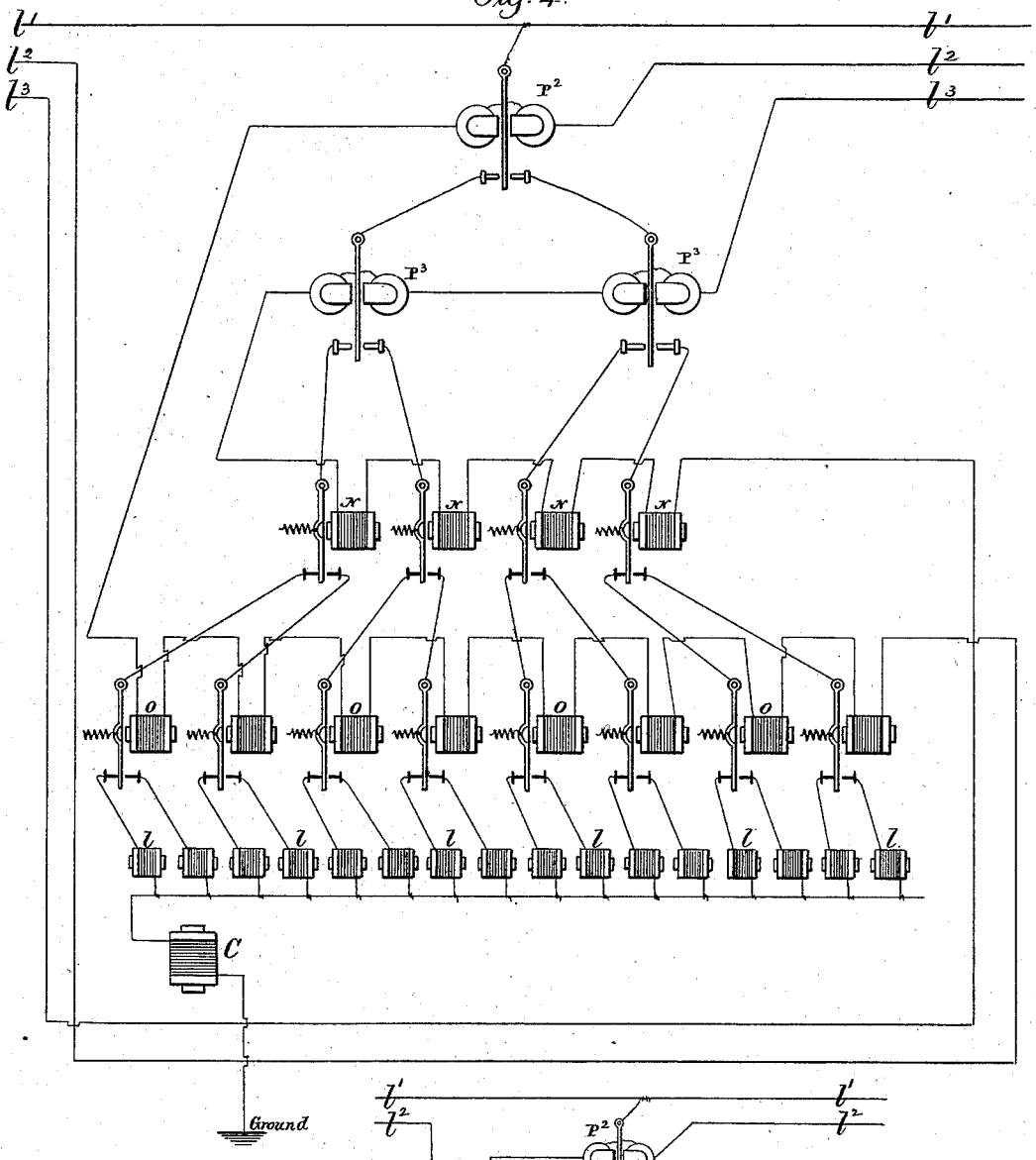

The adjustments of the springs to the relay-armatures are such that the current to the printing-instrument over line $l'$ is the last to close, so that the currents in the other lines close first to prepare the way for the current on $l'$ by moving the switches. If the fourth line, $l^4$, is dispensed with, the connections can be made from the polarized relays $P^3$ direct to four of the magnet-switches N, and the current can be switched by N to eight of the magnet-switches O, and thence to one of sixteen places. In Fig. 4 such an arrangement of the circuits is represented, from which it will be seen that by the use of positive or negative and strong or weak currents in the lines $l^2$ $l^3$, in the manner before described, the constant current from $l'$ will be sent through the armatures of the polarized magnets $P^2$ $P^3$ to one of the armatures of the magnets N, thence to one of the armatures of O, and to the required helix $l$, according to the respective currents sent on said lines $l^2$ $l^3$, as before explained.

Figure 5:
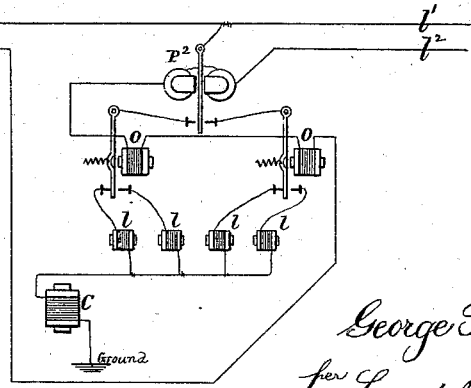

If the lines $l^3$ and $l^4$ and their instruments are dispensed with, the current may be directed by $P^2$ to two of the magnets O, and by their switches to one of four places, as seen in the diagram Fig. 5. In this case the current on $l^2$ may be + or —, weak or strong. By the change of polarity the current will be diverted to the right or left armature of the magnets O by the polarized magnet $P^2$, and with weak currents the spring of such armature will not be overcome, and the current from $l'$ will pass to the helix $l$, that is in circuit with the back stop. When strong currents are used the spring will be overcome and the contact made with the front stop to send the current through the helix $l$, that is in contact therewith.

It will be apparent by reference to Figs. 2 and 3 that the method of directing a current from one line to one of several branch wires may be used in annunciators, rheotomes, and other electric appliances, and that this feature of my invention is not necessarily limited to printing-telegraphs.

By the arrangement shown sixteen more signals may be obtained by placing magnet-armatures and switch-connections in the wires corresponding to the wire 37, as illustrated in the diagram Fig. 6, and by using five line-wires instead of four and duplicating the circuit-connections the number of branch wires may be increased in proportion.

In the diagram Fig. 3 a representation is made of a battery, so as to indicate the polarity and strength of current. It is to be understood that the currents from dynamo-machines may be used, or the batteries arranged in any other suitable manner to supply the proper strength and polarity of current.

By employing condensers in shunts, as shown at 10, 11, and 12, Fig. 2, the effect of static charge and discharge upon the lines will be neutralized.

I claim as my invention—

1. The combination, with a type-wheel and means for revolving the same, of an arm or stop on the type-wheel shaft, a circular range of stops corresponding to the divisions in the type-wheel, and electro-magnets for operating said stops, substantially as set forth.

2. The combination, with the type-wheel and means for revolving the same, of a stop on the type-wheel shaft, a circular range of stops, electro-magnets for operating the same, a printing-lever, a tooth on the same, and a toothed wheel on the type-wheel shaft, substantially as set forth.

3. The combination, with the type-wheel, its shaft, stop, and tooth-wheel, of a printing-lever, a spring to give the impression, a tooth to hold the type-wheel, and an electro-magnet to draw down the lever, substantially as set forth.

4. The combination, with a type-wheel and its stop, of a circular range of stops, electro-magnets to operate the same, and transmitting-keys, lines, and polarized and electro-magnetic switches to direct the current, substantially as set forth.

5. In combination with two line-wires, $l'$ $l^2$, and means for sending upon the line-wires $l^2$ currents of varying strength and of positive or negative polarity, a polarized switch, $P^2$, and the magnetic switches O, and circuit-connections, substantially as set forth, for directing the current of the line $l'$ to one of several places, substantially as specified.

6. The combination, with three line-wires, of polarized switches and magnetic switches in the second and third line-wire circuits, and means for varying the strength of currents and the polarity on the said second and third line-wires, whereby the current from the first line is directed, substantially as set forth.

7. The combination, with four line-wires, of polarized switches and magnetic switches in the second, third, and fourth line-wire circuits, and means for varying the strength of currents and the polarity on the said second, third, and fourth line-wires, whereby the current from the first line-wire is directed, substantially as set forth.

8. In a printing-telegraph, a type-wheel having two 0's, ($_0^0$,) one above the other, to represent hundreds, or three 0's, ($_0^0$,) one above the other, to represent thousands, substantially as set forth.

Signed by me this 4th day of October, A. D. 1882.

GEO. B. SCOTT.

Witnesses:
CHAS. H. SMITH,
J. HAIB.